US012804429B2

(12) United States Patent
Xue et al.

(10) Patent No.: US 12,804,429 B2
(45) Date of Patent: Nov. 17, 2026

(54) METHODS, DEVICES, AND SYSTEMS FOR CONFIGURING UE WITH PRIORITY INDICATION FOR MEASUREMENT TASK

(71) Applicant: ZTE Corporation, Shenzhen (CN)

(72) Inventors: Yan Xue, Shenzhen (CN); Feng Xie, Shenzhen (CN); Li Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 283 days.

(21) Appl. No.: 18/487,262

(22) Filed: Oct. 16, 2023

(65) Prior Publication Data

US 2024/0107348 A1 Mar. 28, 2024

Related U.S. Application Data

(63) Continuation of application No. PCT/CN2021/093280, filed on May 12, 2021.

(51) Int. Cl.
*H04W 24/08* (2009.01)

(52) U.S. Cl.
CPC .................................. *H04W 24/08* (2013.01)

(58) Field of Classification Search
CPC .................................................... H04W 24/08
See application file for complete search history.

(56) References Cited

U.S. PATENT DOCUMENTS

2011/0250893 A1 10/2011 Lee et al.
2013/0109423 A1* 5/2013 Iwamura ............... H04W 72/56 455/512
2017/0164419 A1 6/2017 Kim
2020/0068422 A1 2/2020 Wang et al.
2021/0044999 A1* 2/2021 Chen ...................... H04W 4/80
(Continued)

FOREIGN PATENT DOCUMENTS

CN 102123416 A 7/2011
CN 103167533 A 6/2013
(Continued)

OTHER PUBLICATIONS

Extended European Search Report regarding Application No. EP 21 94 1306 dated May 6, 2024, 9 pages.
(Continued)

*Primary Examiner* — Abdeltif Ajid
(74) *Attorney, Agent, or Firm* — Crowell & Moring LLP

(57) ABSTRACT

The present disclosure describes methods, system, and devices for configuring a user equipment (UE) with priority information for measurement task. One method includes sending, by the RAN node, a configuration message to the UE, the configuration message comprising the priority information, so that the UE performs a measurement task and reports at least one measurement result according to the priority information; and receiving, by the RAN node, the at least one measurement result from the UE. Another method includes receiving, by the UE, a configuration message from a radio access network (RAN) node, the configuration message comprising the priority information; and performing, by the UE, a measurement task and reporting at least one measurement result according to the priority information.

18 Claims, 8 Drawing Sheets

(56) References Cited

U.S. PATENT DOCUMENTS

| | | | | |
|---|---|---|---|---|
| 2022/0078654 | A1* | 3/2022 | Manolakos | H04W 72/566 |
| 2023/0030697 | A1* | 2/2023 | Hu | H04B 17/104 |
| 2023/0231687 | A1* | 7/2023 | Huang | H04L 5/005 |
| 2024/0236745 | A1* | 7/2024 | He | H04W 24/10 |
| 2024/0306016 | A1* | 9/2024 | Kazmi | H04B 7/0602 |

FOREIGN PATENT DOCUMENTS

| | | | |
|---|---|---|---|
| EP | 2736297 | A2 | 5/2014 |
| WO | WO2012/023730 | A3 | 2/2012 |
| WO | WO2012023730 | A2 | 2/2012 |

OTHER PUBLICATIONS

International Search Report and Written Opinion regarding PCT/CN2021/093280 dated Feb. 10, 2022.

* cited by examiner

METHODS, DEVICES, AND SYSTEMS FOR CONFIGURING UE WITH PRIORITY INDICATION FOR MEASUREMENT TASK

CROSS-REFERENCE TO RELATED APPLICATION

This application is a continuation application of PCT International Patent Application No. PCT/CN2021/093280, filed with the China National Intellectual Property Administration, PRC on May 12, 2021, which is herein incorporated by reference in its entirety.

TECHNICAL FIELD

The present disclosure is directed generally to wireless communications. Particularly, the present disclosure relates to methods, devices, and systems for configuring a user equipment (UE) with priority indication for measurement task.

BACKGROUND

Wireless communication technologies are moving the world toward an increasingly connected and networked society. In some previous generation of wireless communications, manual driving test has been used to perform various kinds of driving test against various network associated objects and quantities. This manual driving test is time consuming and costly. In recent developing generations of wireless communications, minimization of drive test (MDT) emerges to replace manual driving test to perform various kinds of driving test of MDT tasks against various network associated objects and quantities and to collect MDT measurement results.

However, there are various problems/issues associated with the present MDT framework. For example but not limited to, one problem/issue may be that the present MDT mechanism framework may not efficiently perform an MDT task with an expected service effect.

The present disclosure describes various embodiments for configuring a user equipment (UE) with priority indication for measurement task, addressing at least one of the problems/issues discussed above. The present disclosure may enhance MDT mechanism and configuration of selecting and configuring UE with various measurement tasks, improving a technology field in the wireless communication.

SUMMARY

This document relates to methods, systems, and devices for wireless communication, and more specifically, for configuring a user equipment (UE) with priority indication for measurement task.

In one embodiment, the present disclosure describes a method for wireless communication. The method includes configuring, by a radio access network (RAN) node, a user equipment (UE) with priority information for a measurement by: sending, by the RAN node, a configuration message to the UE, the configuration message comprising the priority information, so that the UE performs a measurement task and reports at least one measurement result according to the priority information; and receiving, by the RAN node, the at least one measurement result from the UE.

In another embodiment, the present disclosure describes a method for wireless communication. The method includes configuring, by a radio access network (RAN) node, a user equipment (UE) with priority information for minimization of drive test (MDT) by: receiving, by the RAN node, a start message from a core network (CN) or an operation and maintain system (OAM), the start message comprising the priority information; and in response to receiving the start message, sending, by the RAN node, a configuration message to the UE, the configuration message comprising the priority information, so that the UE performs at least one MDT task and reports at least one MDT measurement result according to the priority information.

In another embodiment, the present disclosure describes a method for wireless communication. The method includes configuring a user equipment (UE) with priority information for a measurement by: receiving, by the UE, a configuration message from a radio access network (RAN) node, the configuration message comprising the priority information; and performing, by the UE, a measurement task and reporting at least one measurement result according to the priority information.

In another embodiment, the present disclosure describes a method for wireless communication. The method includes configuring a user equipment (UE) with priority information for minimization of drive test (MDT) by: receiving, by the UE, a configuration message from a radio access network (RAN) node, the configuration message comprising the priority information, wherein: a core network (CN) or an operation and maintain system (OAM) sends a start message to the RAN node, the start message comprising the priority information, and in response to receiving the start message from the CN or the OAM, the RAN node sends the configuration message to the UE; and performing, by the UE, at least one MDT task and reporting at least one MDT measurement result according to the priority information.

In another embodiment, the present disclosure describes a method for wireless communication. The method includes configuring, by a core network (CN), a user equipment (UE) with priority information for a measurement by: sending, by the CN, a start message to a radio access network (RAN) node, the start message comprising the priority information, wherein: in response to receiving the start message, the RAN node sends a configuration message to the UE, the configuration message comprising the priority information, so that the UE performs at least one measurement task and reports at least one measurement result according to the priority information.

In another embodiment, the present disclosure describes a method for wireless communication. The method includes configuring, by a core network (CN), a user equipment (UE) with priority information for minimization of drive test (MDT) by: sending, by the CN, a start message to a radio access network (RAN) node, the start message comprising the priority information, wherein: in response to receiving the start message, the RAN node sends a configuration message to the UE, the configuration message comprising the priority information, so that the UE performs at least one MDT task and reports at least one MDT measurement result according to the priority information.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory.

When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

Figure 1A:
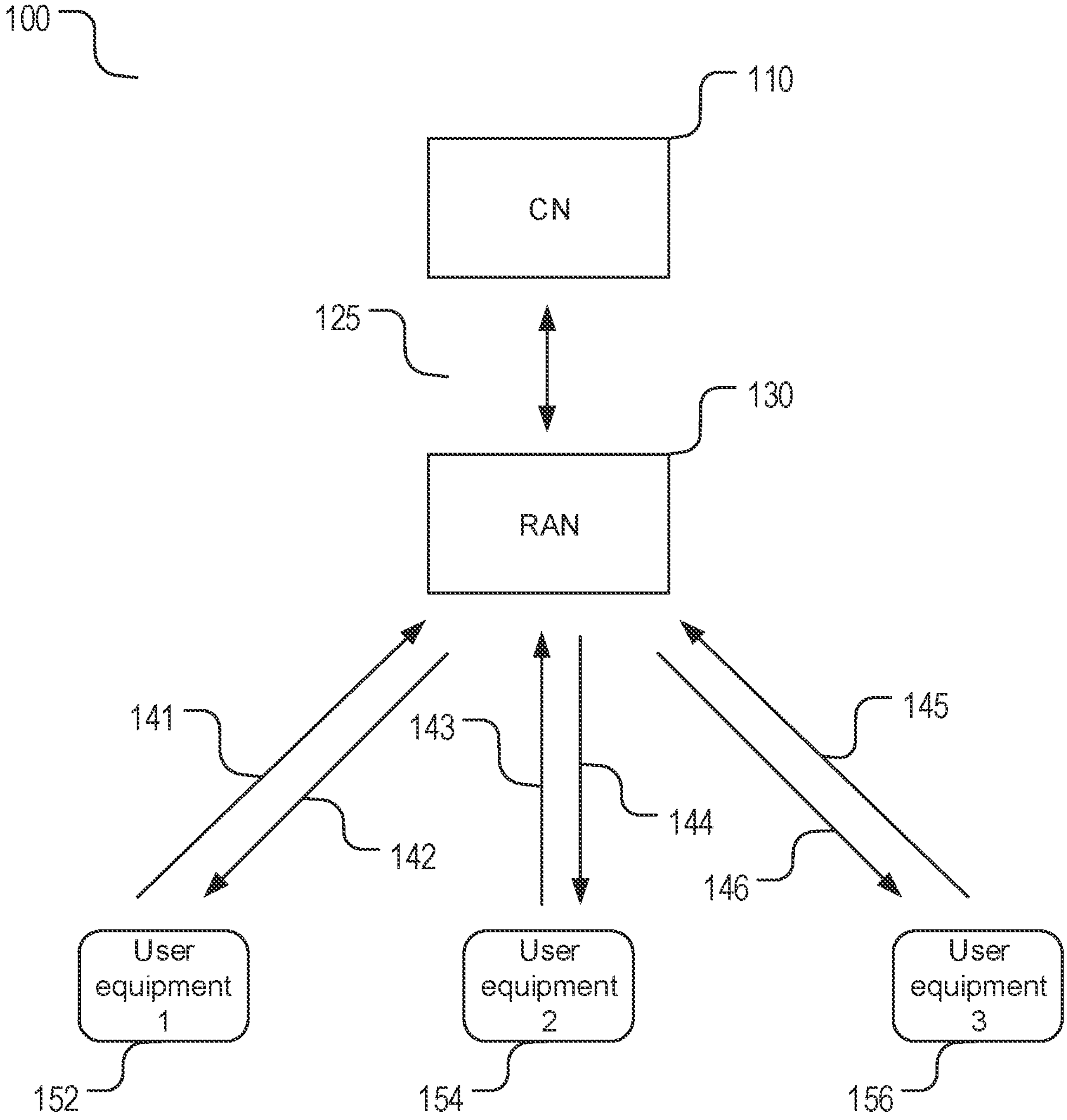
FIG. 1A shows an example of a wireless communication system include a core network, a wireless network node, and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various methods and devices for configuring a user equipment (UE) with priority indication for minimization of drive test (MDT). It is known to those in the art that an MDT or MDT task is one example of measurement or measurement task in the present disclosure. The various embodiments in the present disclosure are also applicable for other measurement task.

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfill the requirements from different industries and users.

FIG. 1A shows a wireless communication system 100 including a core network (CN) 110, a wireless node 130, and one or more user equipment (UE) (152, 154, and 156). The wireless node 130 may include a wireless network base station, a radio access network (RAN) node, or a NG radio access network (NG-RAN) base station or node, which may include a nodeB (NB, e.g., a gNB) in a mobile telecommunications context. In one implementation, the core network 110 may include a 5G core network (5GC or 5GCN), and the interface 125 may include a NG interface. The wireless node 130 (e.g, RAN) may include an architecture of separating a central unit (CU) and one or more distributed units (DUs).

The communication between the RAN and the one or more UE may include at least one radio bearer (RB) or channel (RB/channel). Referring to FIG. 1A, a first UE 152 may wirelessly receive from the RAN 130 via a downlink RB/channel 142 and wirelessly send communication to the RAN 130 via a uplink RB/channel 141. Likewise, a second UE 154 may wirelessly receive communicate from the RAN 130 via a downlink RB/channel 144 and wirelessly send communication to the RAN 130 via a uplink RB/channel 143; and a third UE 156 may wirelessly receive communicate from the RAN 130 via a downlink RB/channel 146 and wirelessly send communication to the RAN 130 via a uplink RB/channel 145.

In some previous generation of wireless communications, manual driving test has been used to perform various kinds of driving test against various network associated objects and quantities. This manual driving test is time consuming and costly. In recent developing generations of wireless communications, minimization of drive test (MDT) emerges to replace manual driving test to perform various kinds of driving test of MDT tasks against various network associated objects and quantities and to collect MDT measurement results.

With the latest development of MDT techniques in 3GPP industry field, the NW may select and configure one or more proper UE to perform various kinds of driving test of MDT tasks against various NW associated objects and/or quantities. The NW may collect and retrieve MDT measurement results (e.g., MDT logs) from the one or more participating UE. The NW may optimize itself in various performance aspects, such as radio coverage, radio capacity, service parameter setting, and/or, etc.

However, there are various problems/issues associated with the present MDT framework. For example but not limited to, one problem/issue may be that, in the present MDT mechanism framework, MDT task effect may not meet the requirements. For example, there is no mechanism for a UE to provide the suitable MDT result with priority guarantee. Another problem/issue may be that, in current MDT mechanism framework, although different MDT tasks have the different service quality requirements, the MDT report is transmitted via a radio bear with a same priority, for example, a same priority signaling radio bearer (SRB), resulting in inefficient usage of radio resource, and leading to inefficient and/or unsatisfactory MDT reporting.

Some of the issues/problems may cause inefficient use of radio resource in the air with the present MDT framework; for example, when the resources are not enough for transmitting more than one MDT reports at a situation, the low priority MDT report still uses the high priority SRB, and the use of radio resources is not efficient.

Some of the issues/problems may cause inflexible use of radio bearer in the air with the present MDT framework; for example, MDT report may be transmitted on a same type of SRB, which limits the type of radio bearer that can be used.

The present disclosure describes various embodiments for configuring a user equipment (UE) with priority indication for minimization of drive test (MDT), addressing at least one of the problems/issues discussed above. The present disclosure may also provide more benefits when the NW is able to configure priority requirements in MDT task to get the expected MDT measurement results, so as to enhance MDT mechanism and configuration of selecting and configuring UE with various MDT tasks, thus improving a technology field in the wireless communication.

Figure 1B:
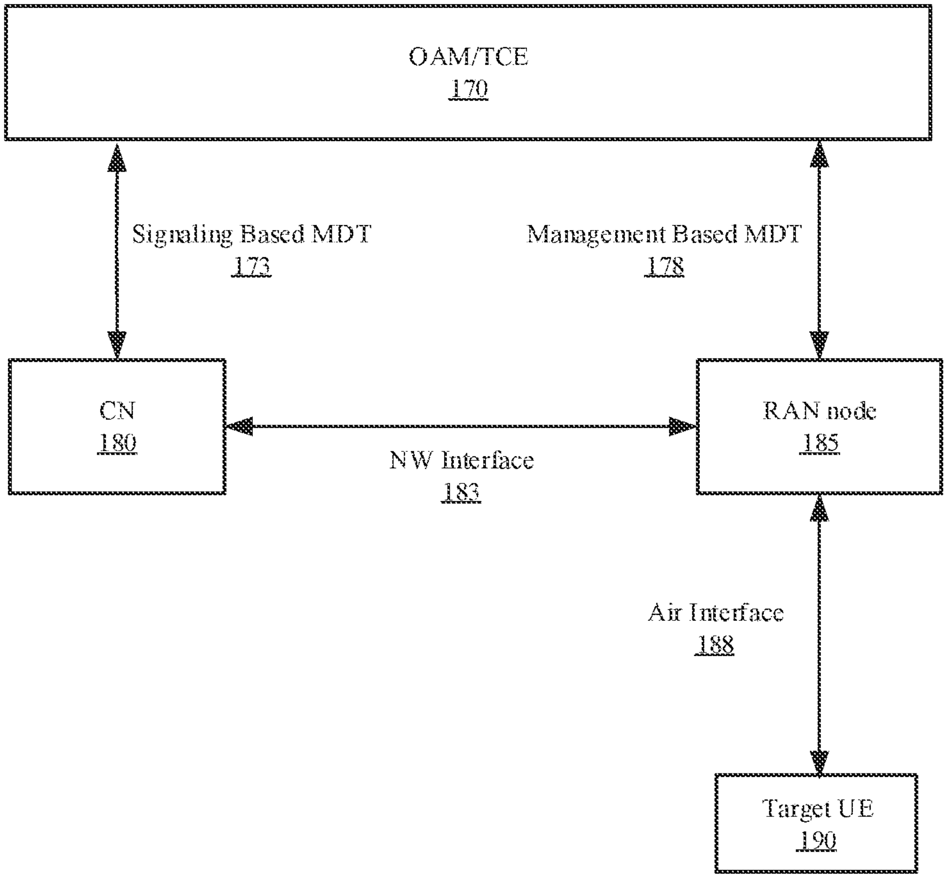
FIG. 1B shows a schematic diagram of configuring a user equipment (UE) for minimization of drive test (MDT).

FIG. 1B shows a schematic diagram for a NW to select and configure a proper UE for expected MDT tasks. The NW may include a CN 180 and/or a RAN node 185. The CN 180 and/or the RAN node 185 may communicate with an operation and maintenance (OAM) including a trace collection entity (TCE) 170 via for a signaling based MDT 173 and/or a management based MDT 178, respectively. The CN 180 may communicate with the RAN node 185 via a NW interface 183. The RAN node 185 may communicate with a target UE 190 via an air interface 188.

In the classic cellular mobile systems such as 4G Long Term Evolution-Advanced (LTE-A) and 5G New Radio (NR), the MDT feature may be implemented to replace or supplement the legacy costly manual driving test. The LTE-A system may introduce a series of (enhanced) MDT features, and the NR system may introduce a series of (enhanced) MDT features. For both LTE-A and NR systems, the NW (e.g., CN or RAN) may select and configure one or more proper target UE(s) to perform various kinds of MDT tasks against various NW associated objects and/or quantities. The NW may collect and retrieve MDT measurement results from those UEs via signaling radio bearer (SRB) in the air, and may further upload the MDT measurement results (e.g., MDT logs) onto up streamed TCE in the OAM. Based on those MDT measurement results and logs, the NW may analyze and figure out various NW problems and defects so that the NW may further optimize itself in many performance aspects, such as radio coverage, radio capacity, service parameter settings, etc.

In some implementations, the NW may collect and retrieve MDT measurement results from those UEs via different kind of radio bearer in the air, for example but not limited to, signaling radio bearer (SRB), data radio bearer (DRB), or any other types of radio bearer. For one example, a UE may report some measurement results of the UE via a SRB and some measurement results of the UE via a DRB according to the priority information. For another example, one or more UE may report measurement results via one or more SRB, and other one or more UE may report measurement results via one or more DRB according to the priority information.

In some implementations, some measurement result may be reported later according to the priority information. For example in the case of many measurement reports, if the low priority measurement reports still use a high priority SRB, the radio resources are occupied by the low priority measurement reports, which may cause insufficient radio resources for the high priority measurement reports and traffic data, and thus the high priority measurement reports may not be received in time. In some extreme situations, a communication congestion may happen when there are lack of radio resources for DRB. According to priority information, the low priority measurement report may use the low priority radio bearer, which has the low priority to transmission opportunity and network resource allocation. It may ensure the radio resources for high priority measurement reports and traffic data transmission are not occupied. In some implementations, the priority information indicates differentiated transmission requirements. In some implementations, the measurement reports may include MDT reports and/or other measurement reports.

The TCE in OAM 170 may trigger and initiate one or more MDT tasks towards the CN 180 firstly, and then the CN may trigger and initiate the MDT tasks towards a certain RAN node to communicate with a specific target UE. The RAN node 185 may configure the target UE 190 with the one or more particular MDT tasks via SRB in the air. In one implementation, the above procedure may be called signaling based MDT.

In another implementation, the TCE in OAM 170 may trigger and initiate one or more MDT tasks towards a certain RAN node directly but without indicating specific target UE, and then the RAN node may locally select, for example, based on management based MDT PLMN list from user consent information, and may configure a particular target UE with one or more particular MDT tasks via SRB in the air. The above procedure may be called management based MDT. Optionally, in some implementations above, it may be always the NW (CN or RAN) to select the proper UE(s) for expected MDT tasks.

Figure 2:
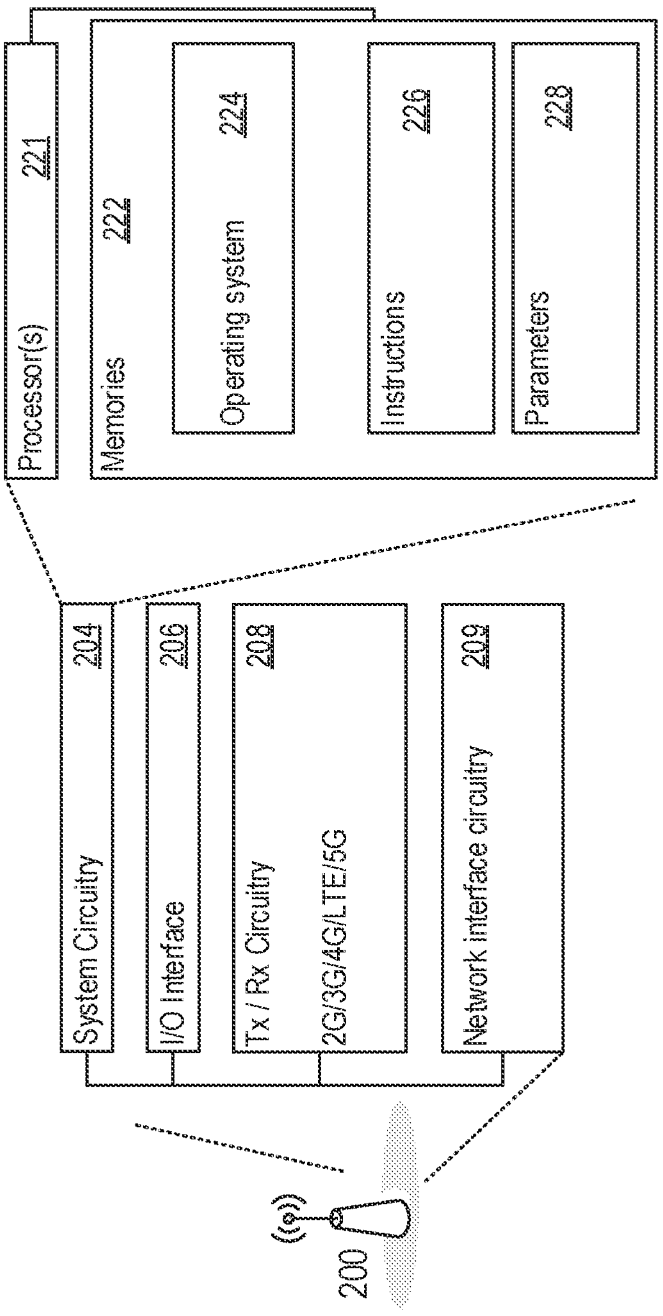
FIG. 2 shows an example of a wireless network node.

FIG. 2 shows an example of electronic device 200 to implement a network base station (e.g., a radio access network node), a core network (CN), and/or an operation and maintenance (OAM). Optionally in one implementation, the example electronic device 200 may include radio transmitting/receiving (Tx/Rx) circuitry 208 to transmit/receive communication with UEs and/or other base stations. Optionally in one implementation, the electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
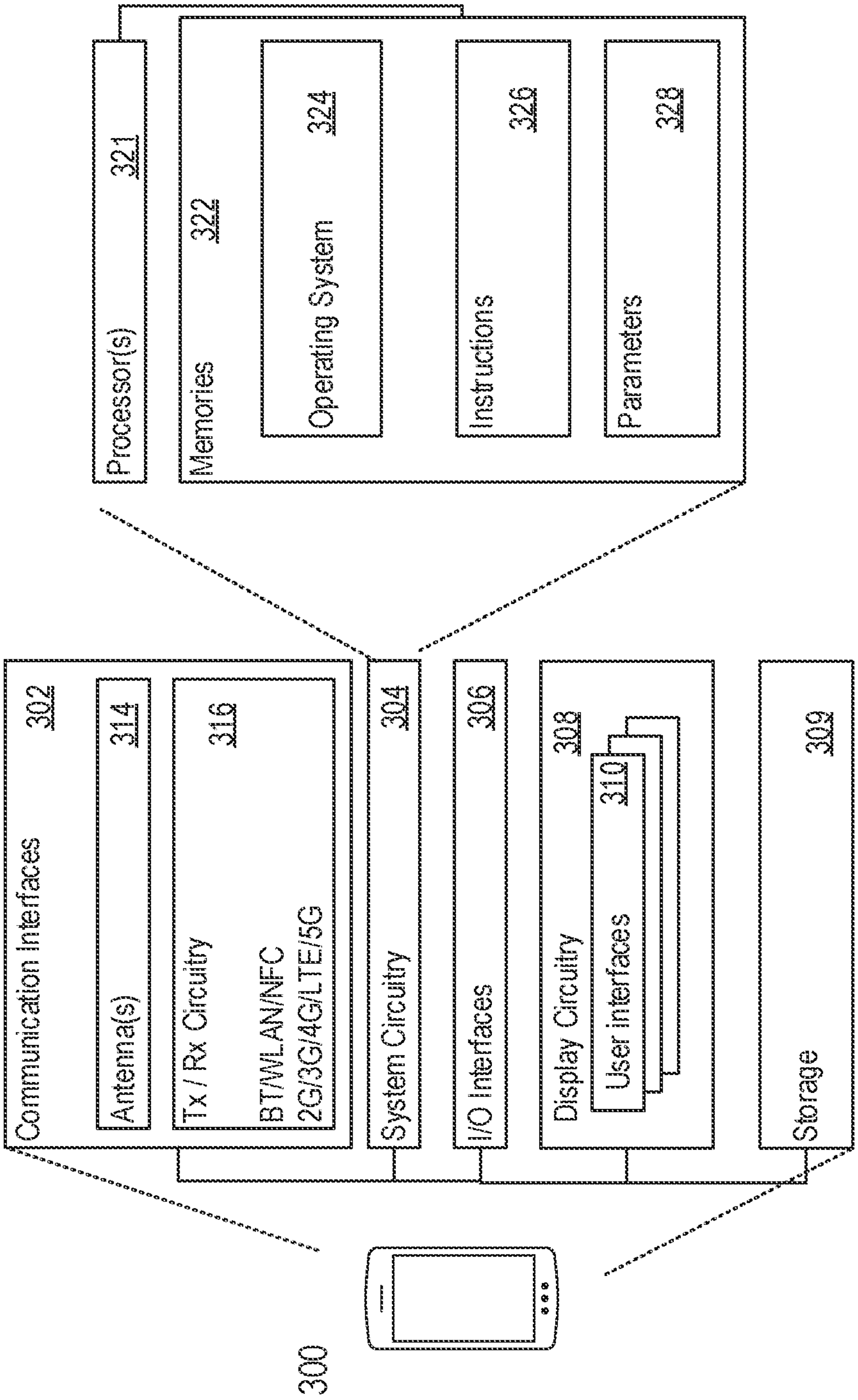
FIG. 3 shows an example of a user equipment.

FIG. 3 shows an example of an electronic device to implement a terminal device 300 (for example, a user equipment (UE)). The UE 300 may be a mobile device, for example, a smart phone or a mobile communication module disposed in a vehicle. The UE 300 may include a portion or all of the following: communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes various embodiments for configuring a user equipment (UE) with priority indication for minimization of drive test (MDT), which may be implemented, partly or totally, on one or more electronic device 200 and/or one or more terminal device 300 described above in FIGS. 2-3.

In the present disclosure, one or more framework and procedure for signaling based MDT and management based MDT may be inherited and reused partially or in its entirety as much as possible. For a portion or all existing MDT configuration information may include, for example but not limited to, an information element (IE) "MDT Configuration-NR" and/or "MDT Configuration-EUTRA", and potentially new MDT configuration information, a NW, which may include a CN and/or a RAN, may provide and/or configure new MDT configuration information to a UE, so that the UE may perform the MDT tasks as expected by the NW.

Figure 4:
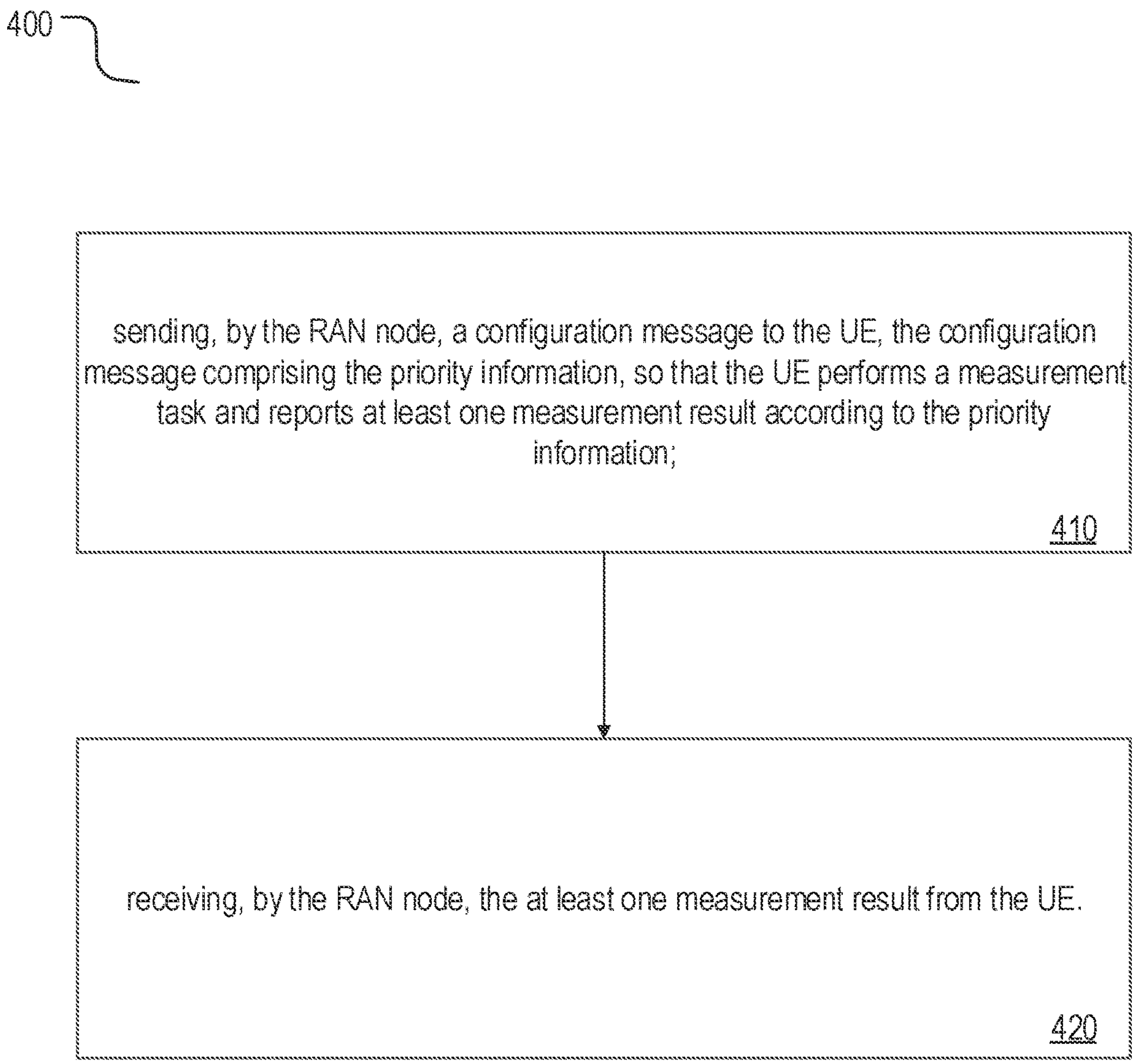
FIG. 4 shows a flow diagram of a method for wireless communication.

In one embodiment, referring to FIG. 4, a method 400 for wireless communication includes configuring, by a radio access network (RAN) node, a user equipment (UE) with priority information for a measurement. The method 400 may include a portion or all of the following steps: step 410, sending, by the RAN node, a configuration message to the UE, the configuration message comprising the priority information, so that the UE performs a measurement task and reports at least one measurement result according to the priority information; and step 420, receiving, by the RAN node, the at least one measurement result from the UE. In one implementation, the measurement comprises a minimization of drive test (MDT); and the measurement task comprises an MDT task. In another implementation, the priority information is not only applicable to an MDT task, but also applicable to other measurement task.

Figure 5:
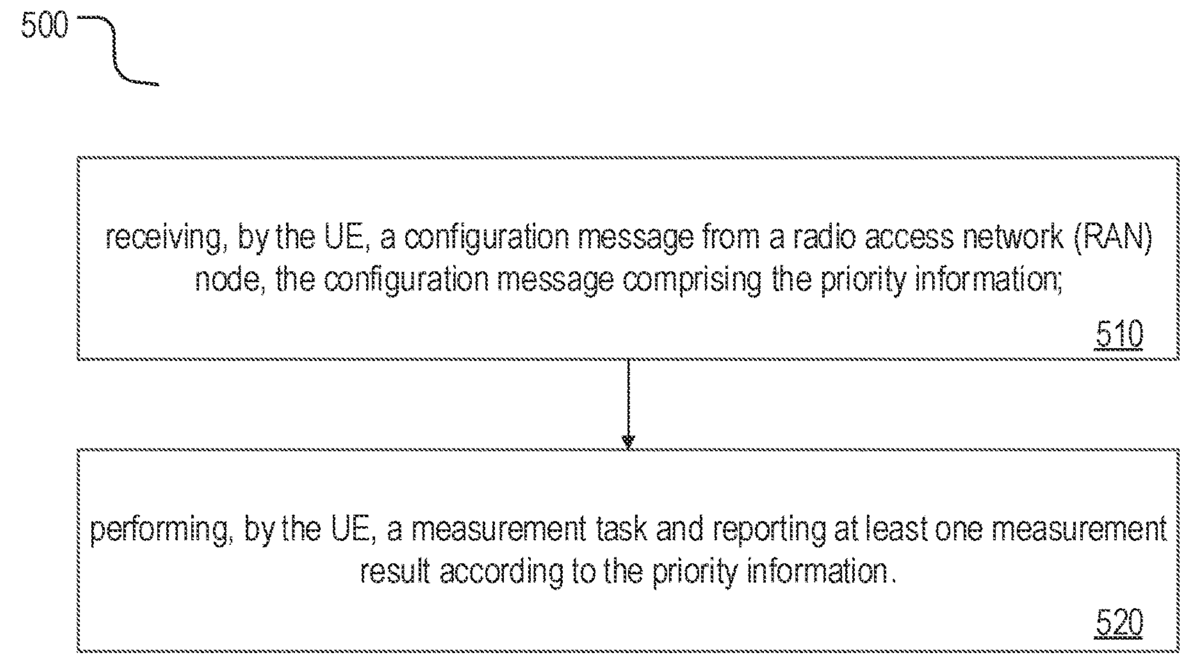
FIG. 5 shows a flow diagram of a method for wireless communication.

In another embodiment, referring to FIG. 5, a method 500 for wireless communication includes configuring a user equipment (UE) with priority information for a measurement. The method 500 may include a portion or all of the following steps: step 510, receiving, by the UE, a configuration message from a radio access network (RAN) node, the configuration message comprising the priority information; and step 520, performing, by the UE, a measurement task and reporting at least one measurement result according to the priority information. In one implementation, the measurement comprises a minimization of drive test (MDT); and the measurement task comprises an MDT task. In another implementation, the priority information is not only applicable to an MDT task, but also applicable to other measurement task.

Figure 6:
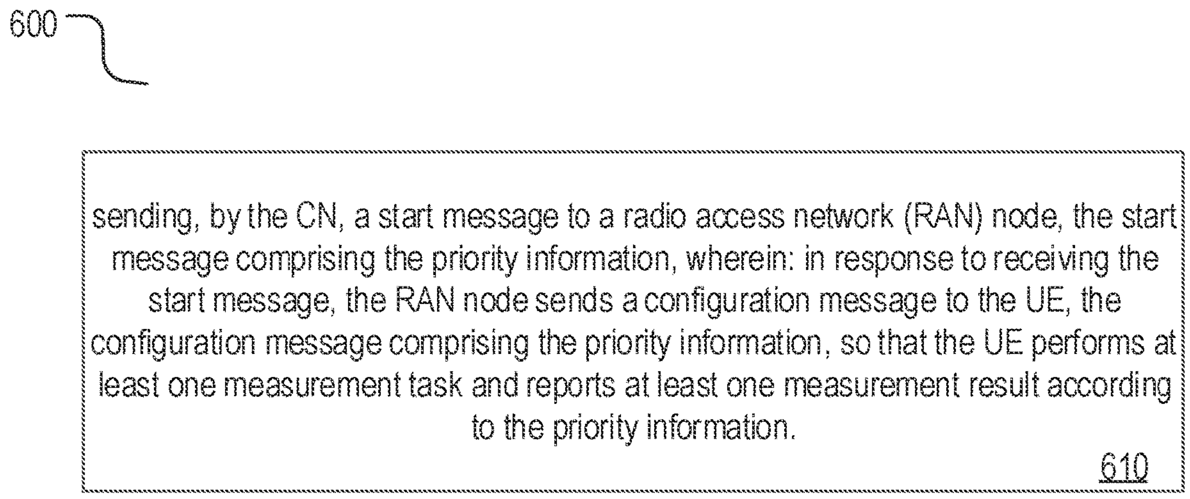
FIG. 6 shows a flow diagram of a method for wireless communication.

In another embodiment, referring to FIG. 6, a method 600 for wireless communication includes configuring, by a core network (CN), a user equipment (UE) with priority information for a measurement. The method 600 may include step 610, sending, by the CN, a start message to a radio access network (RAN) node, the start message comprising the priority information, wherein: in response to receiving the start message, the RAN node sends a configuration message to the UE, the configuration message comprising the priority information, so that the UE performs at least one measurement task and reports at least one measurement result according to the priority information. In one implementation, the measurement comprises a minimization of drive test (MDT); and the measurement task comprises an MDT task. In another implementation, the priority information is not only applicable to an MDT task, but also applicable to other measurement task.

In the present disclosure, various embodiments may be described by taking examples of MDT and/or MDT task, which merely serves as example but not limitations to the scope of described embodiments.

In another embodiment, a method may include configuring, by a radio access network (RAN) node, a user equipment (UE) with priority information for minimization of drive test (MDT). The method may include receiving, by the RAN node, a start message from a core network (CN) or an operation and maintain system (OAM), the start message comprising the priority information; and/or, in response to receiving the start message, sending, by the RAN node, a configuration message to the UE, the configuration message comprising the priority information, so that the UE performs at least one MDT task and reports at least one MDT measurement result according to the priority information. In one implementation, the start message may include a NGAP:TRACE START message.

In another embodiment, a method may include configuring a user equipment (UE) with priority information for minimization of drive test (MDT). The method may include receiving, by the UE, a configuration message from a radio access network (RAN) node, the configuration message comprising the priority information, wherein: a core network (CN) or an operation and maintain system (OAM) sends a start message to the RAN node, the start message comprising the priority information, and in response to receiving the start message from the CN or the OAM, the RAN node sends the configuration message to the UE; and/or, performing, by the UE, at least one MDT task and reporting at least one MDT measurement result according to the priority information. In one implementation, the start message may include a NGAP:TRACE START message.

In another embodiment, a method for wireless communication includes configuring, by a core network (CN), a user equipment (UE) with priority information for minimization of drive test (MDT). The method may include sending, by the CN, a start message to a radio access network (RAN) node, the start message comprising the priority information, wherein: in response to receiving the start message, the RAN node sends a configuration message to the UE, the configuration message comprising the priority information, so that the UE performs at least one MDT task and reports at least one MDT measurement result according to the priority information. In one implementation, the start message may include a NGAP:TRACE START message.

In one implementation, the priority information comprises at least one of a priority parameter, a delay parameter, or a mapping rule.

In another implementation, the start message comprises non-access stratum (NAS) information; and the configuration message comprises the NAS information.

In another implementation, the start message is transmitted via a NAS procedure so that the priority information is transparent to the RAN node.

In another implementation, the start message is transmitted via an access stratum (AS) procedure; and in response to receiving the start message, the RAN node compiles and sends the configuration message to the UE.

In another implementation, the RAN node compiles and sends a radio resource control (RRC) message to the UE, the RRC message comprising the configuration message for the UE.

In another implementation, the priority information indicates the level of priority/urgency/importance for a UE to perform the relevant MDT tasks and/or for the UE to determine the radio bearer to report the tasks result according to the requirements in priority information.

In another implementation, the priority information includes one at least of the following parameters: priority, delay, or mapping rule.

In another implementation, upon receiving above priority information, a RAN node may forward and configure it to a UE, and the UE may perform a corresponding MDT task and report the tasks result with the requirement of priority information.

In another implementation, upon performing MDT task, a UE may map the MDT task report to different SRB according to priority parameter in priority information. The result of high priority MDT task maps to the SRB with high priority, and the result of low priority MDT task maps to a radio bearer with low priority, for example but not limited to, a SRB, a DRB, or any other radio bearer.

In another implementation, upon performing MDT task, a UE may report the MDT task result according to priority parameter in priority information. The MDT task with high priority reports with less delay, the MDT task with low priority reports with more delay.

In another implementation, upon performing MDT task, a UE may map the MDT task result to a radio bearer, for example but not limited to, a SRB, a DRB, or any other type of radio bearer, according to priority information.

In another implementation, the priority information is used for the UE to determine the radio bearer to transmit the at least one MDT measurement result.

In another implementation, according to the priority information, the UE determines one or more corresponding radio bearer to report the at least one MDT measurement result, which may include, for example but not limited to, one or more SRB, one or more DRB, one or more other type of radio bearer, or any big data AI bearer.

In another implementation, the UE reports the at least one MDT measurement result via the radio bearer which is determined by UE according to the priority information.

In another implementation, the priority parameter may indicate transmission priority level of the measurement report. The priority level is expressed as high, middle, or low. Or the priority level is expressed as level number like level 1, level 2, and/or, etc. According to the priority parameter, the UE determines which radio bearer to be used for the measurement report, for example, different priority parameter may indicate different types of radio bearer. In one implementation, when the priority parameter indicates a high priority, a SRB is indicated; and when the priority parameter indicates a low priority, a DRB is indicated. In another implementation, when the priority parameter indicates a high priority, a DRB is indicated; and when the priority parameter indicates a low priority, a SRB is indicated.

In another implementation, the time delay and/or reliability of SRB may not be better than the time delay and/or reliability of DRB. In one implementation, an MDT measurement report may be transmitted via a DRB; and an MDT measuring report with high priority may be transmitted via or mapped to a DRB with high priority.

In another implementation, there are a lot of measurement results to report. In response to the priority parameter, the UE configures the radio bearer with a higher priority for the measurement result of higher priority and the radio bearer with a low priority for the measurement result of low priority. In another implementation, the UE configures the big data radio bearer with a higher priority for the measurement result of higher priority and the big data radio bearer with a low priority for the measurement result of low priority.

In another implementation, in response to the priority parameter indicating a high priority, the UE configures the radio bearer with a higher priority for transmitting the at least one measurement result; and in response to the priority parameter indicating a low priority, the UE configures the radio bearer with a low priority for transmitting the at least one measurement result.

In another implementation, a delay in the priority information may include one at least of the following parameters: report with no delay, report with certain time delay, or report in a specific time.

In another implementation, the priority information comprises a delay parameter; and the delay parameter indicates at least one of the following: reporting the at least one MDT measurement result without delay, reporting the at least one MDT measurement result within a time duration, or reporting the at least one MDT measurement result at a specific time.

In another implementation, in response to the delay parameter comprising zero, the delay parameter indicates reporting the at least one MDT measurement result without delay, and the UE reports the at least one MDT measurement result without delay.

In another implementation, in response to the delay parameter comprising the time duration, the delay parameter indicates reporting the at least one MDT measurement result within the time duration, and the UE reports the at least one MDT measurement result within the time duration.

In another implementation, in response to the delay parameter comprising the specific time, the delay parameter indicates reporting the at least one MDT measurement result at a specific time, and the UE reports the at least one MDT measurement result at the specific time.

In another implementation, a mapping rule in the priority information may include one of the following rules: the priority indicates the SRB with the lowest bearer priority used by the MDT result, the bearer priority indicates the SRB with the highest bearer priority used by the MDT result, the bearer priority indicates the SRB used by the MDT result, or the priority indicates the SRB range used by the MDT result.

In another implementation, the priority information comprises a mapping rule; and the mapping rule indicates at least one of the following: a lowest-priority radio bearer to be used for transmitting the at least one MDT measurement result, a highest-priority radio bearer to be used for transmitting the at least one MDT measurement result, a specific radio bearer to be used for transmitting the at least one MDT measurement result, or a range of a plurality of radio bearers to be used for transmitting the at least one MDT measurement result.

In another implementation, in response to the mapping rule comprising an information element (IE) indicating the lowest-priority radio bearer, the mapping rule indicates the lowest-priority radio bearer to be used for transmitting the at least one MDT measurement result, and the UE reports the at least one MDT measurement result via a radio bearer having a higher or same priority as the lowest-priority radio bearer.

In another implementation, in response to the mapping rule comprising an information element (IE) indicating the highest-priority radio bearer, the mapping rule indicates the highest-priority radio bearer to be used for transmitting the at least one MDT measurement result, and the UE reports the at least one MDT measurement result via a radio bearer having a lower or same priority as the highest-priority radio bearer.

In another implementation, in response to the mapping rule comprising an information element (IE) indicating the specific radio bearer, the mapping rule indicates the specific radio bearer to be used for transmitting the at least one MDT measurement result, and the UE reports the at least one MDT measurement result via the specific radio bearer.

In another implementation, in response to the mapping rule comprising an information element (IE) indicating the range of the plurality of radio bearers, the mapping rule indicates the range of the plurality of radio bearers to be used for transmitting the at least one MDT measurement result, and the UE reports the at least one MDT measurement result via a radio bearer within the range of the plurality of radio bearers, inclusive.

Figure 7:
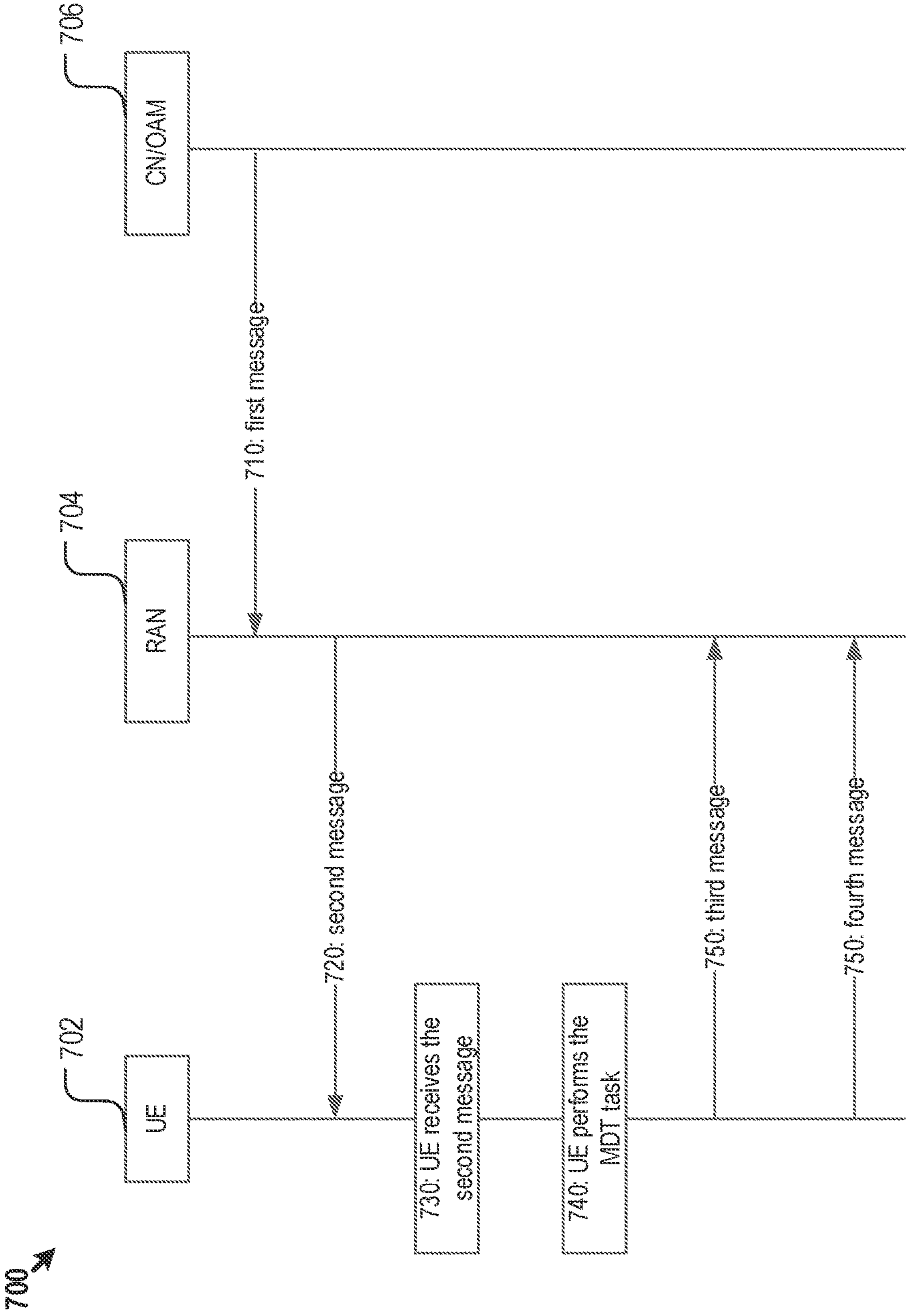
FIG. 7 shows an exemplary logic flow of a method for wireless communication.

For one example of various embodiments, as shown in FIG. 7, in a method 700, a UE (702) may be volunteering to perform one or more MDT task, and is communicating with a NW, which including a RAN 704 or a CN/OAM 706, in RRC_Connected state. The NW may expect the UE to perform an MDT task (MDT task1) of coverage capacity optimization (CCO) and an MDT task (MDT task2) of mobility robustness optimization (MRO). For reducing dropped call, the MDT task2 may have a higher priority than MDT task1. Because SRB1 has the higher transmission priority than SRB2, the RAN node may configure that a UE with the MDT task2 reports via the SRB1 in the air, and the MDT task1 is reported via SRB2 in the air. Thus, the MDT task2 report will be received earlier and more reliable by NW since SRB1 has a higher transmission priority than SRB2. That is, the higher the priority of the task, the higher the priority of the radio bearer that can be used.

An exemplary procedure for configuring a user equipment (UE) with priority indication for minimization of drive test (MDT) is described below. The procedure in various embodiments may include a portion or all the following steps, wherein the steps may be performed in the order described below or in a different order.

Step 710: A 5GC, including CN/OAM, may send a first message, for example, NGAP:TRACE START message, to the RAN node serving the UE at the moment, including the MDT configuration information to the UE for the MDT task1 of measuring radio coverage and for the MDT task2 of measuring mobility. Besides the normal MDT configuration information, the start message may contain one or more new information element (IE). For the UE, it contains a new IE "priority"=2 for configuring the MDT task1; and contains a new IE "priority"=1 for configuring the MDT task2. In some implementations, in addition, the 5GC may send the NAS info in TRACE START message to the UE, indicating them to use different radio resource in the air.

Step 720: Upon receiving the NGAP:TRACE START message, the RAN node compiles and sends the relevant MDT configuration information and NAS info to the UE via a second message, which may include, for example, a RRC RECONFIGURATION message.

Step 730: Upon receiving the second message, for example, a RRC RECONFIGURATION message, the UE obtains the MDT configuration information and the NAS info, so knowing that the NW expects to perform the specific MDT tasks.

Step 740: The UE may perform the expected MDT tasks configured by NW.

Step 750: The UE may report the corresponding MDT measurement results (or MDT logs) of the MDT task2 via a third message via the SRB1 when available via legacy procedures to the NW.

Step 760: Later, the UE1 may report the corresponding MDT measurement results (or MDT logs) of the MDT task1 via a fourth message via the SRB2 when available via legacy procedures to the NW.

For another example of various embodiments, one or more UE is volunteering to perform MDT tasks. The NW expects the UE to perform MDT task of coverage in hot spot area. For network resource occupation in the daytime, the UE may report the MDT result in specific time to avoid the traffic peak period in response to the priority indication.

An exemplary procedure for configuring a user equipment (UE) with priority indication for minimization of drive test (MDT) is described below. The procedure in various embodiments may include a portion or all the following steps, wherein the steps may be performed in the order described below or in a different order.

Step 21: The 5GC sends NGAP:TRACE START message to the RAN node serving the UE at the moment, including the MDT configuration information to the UE for the MDT task of measuring radio coverage. Besides the normal MDT configuration information, the NGAP:TRACE START message contains the new IEs respectively to every MDT UE. For every MDT UE, it contains new IE "delay"=two o'clock in the morning for MDT configuration of task. There are enough network resource for MDT report at this specific time (i.e., two o'clock in the morning) and the MDT report will be better received.

Step 22: Upon receiving the NGAP:TRACE START message, the RAN node compiles and sends the relevant MDT configuration information and NAS info to the UEs via RRC RECONFIGURATION message respectively.

Step 23: Upon receiving the RRC RECONFIGURATION message, the UEs may obtain the MDT configuration information and the NAS info, so knowing that the NW expects to perform the specific MDT tasks.

Step 24: The UEs may perform the expected MDT tasks configured by NW respectively.

Step 25: The UEs may report the corresponding MDT measurement results (or MDT logs) when the delay time is reach via legacy procedures to the NW. In another implementation, the UEs may report the corresponding MDT measurement results (or MDT logs) before the delay time expires to the NW. For example, when the "delay"=20 seconds, the UE may report the corresponding MDT measurement results (or MDT logs) within 20 seconds, and/or the UE may report the corresponding MDT measurement results (or MDT logs) before 20 seconds has passed.

For another example of various embodiments, another UE, for example UE2, is volunteering to perform MDT tasks. The NW expects the UE2 to perform an MDT task1 which is urgent and important and need report the MDT result immediately. The new MDT configuration contains the delay is zero in new IEs, for example, "delay"=0. The NW expects the UE2 to perform an MDT task2 which is not urgent. It is allowed to report the task2's result in certain delay such as 300 milliseconds (ms). The new MDT configuration contains the delay 300 ms in new IEs for the MAT task2, for example, "delay"=300 ms. After the UE2 performs the expected MDT task2, it will find an opportunity to report within 300 millisecond of delay.

For another example of various embodiments, another UE, for example UE3, is volunteering to perform MDT tasks. The NW expects the UE3 to perform several MDT tasks. The tasks may have different priority. The new MDT configuration contains the priority and mapping rule in new IEs. The mapping rule indicate a SRB range of MDT result used and the higher priority task report mapping to the higher priority SRB.

Figure 8:
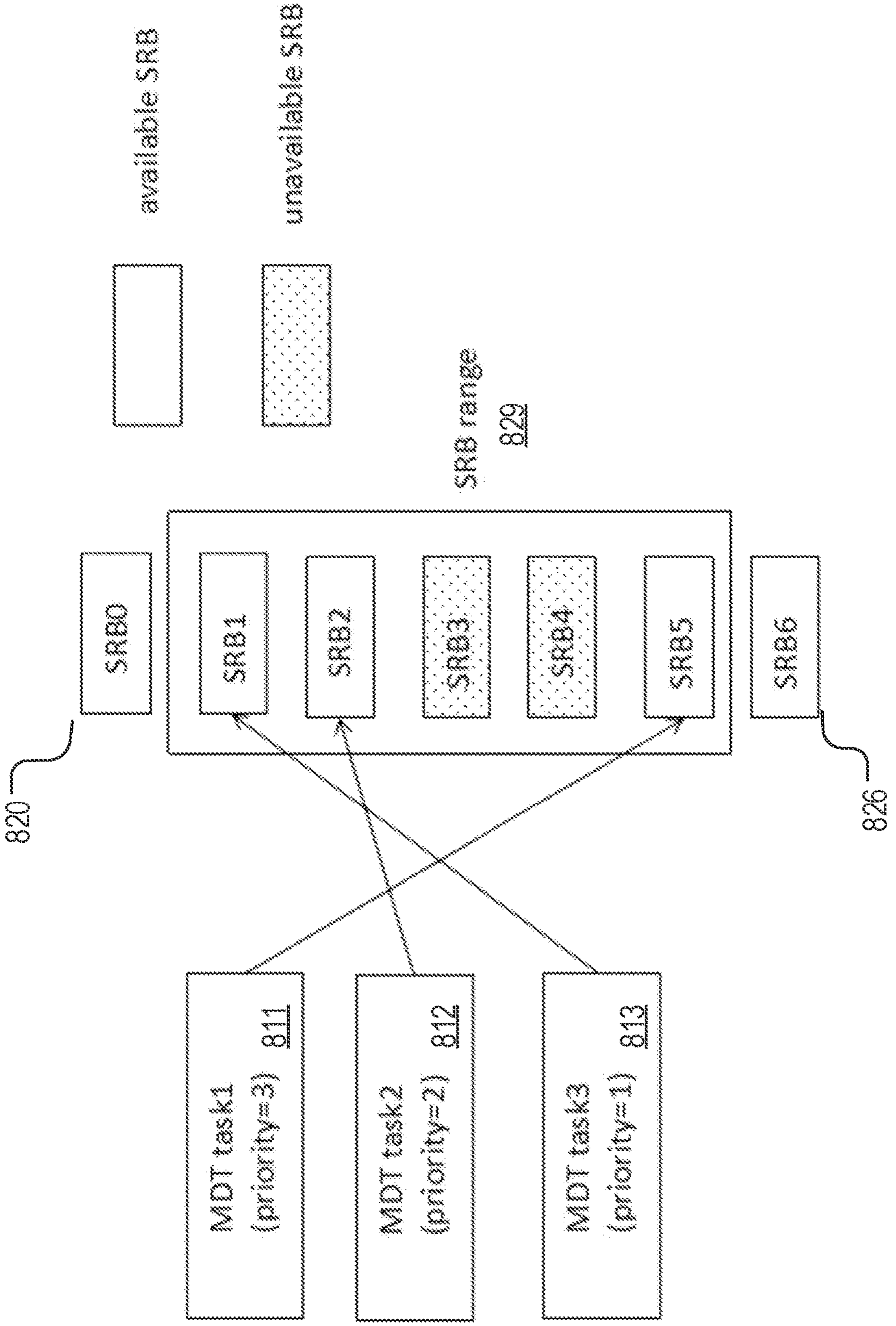
FIG. 8 shows a schematic diagram for a method for wireless communication.

For example, as shown in FIG. 8, the SRB priority may have a priority of SRB0>SRB1>SRB2>SRB3>SRB4>SRB5>SRB6, indicating that SRB0 (820) has the highest priority and the SRB6 (826) has the lowest priority among SRB0, SRB1, SRB2, SRB3, SRB4, SRB5, and SRB6.

The MDT mapping rule indicate the SRB range (829) is SRB1 to SRB5 in which the lowest SRB is SRB5 and the highest SRB is SRB1.

In response to receiving the priority information, the UE3 knows that the MDT task3 (813) has a priority=1 and has a highest priority, so that the MDT task3 report is mapped to SRB1, which has a highest priority in the SRB range (829).

In the same way, the MDT task2 report corresponding to the MDT task2 (812), which has a priority lower than the MDT task3, is mapped to SRB2, which has a priority lower than the SRB1.

When reporting the report of the MDT task1 (811), which has the lowest priority among the three MDT tasks, the UE3 may determine that the SRB3 and SRB4 are unavailable, and the SRB5 is available, so that the UE3 reports the MDT task1 result via SRB5, which has a lowest priority among the three SRBs used to report the three MDT tasks.

It is known to those in the art that an MDT or MDT task is one example of measurement or measurement task in the present disclosure. The various embodiments in the present disclosure are also applicable for other measurement or other measurement task.

The present disclosure describes methods, apparatus, and computer-readable medium for wireless communication. The present disclosure addressed the issues with configuring a user equipment (UE) with priority information for measurement task. The methods, devices, and computer-readable medium described in the present disclosure may facilitate the performance of wireless communication by configuring a UE with priority information for measurement task, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
configuring, by a radio access network (RAN) node, a user equipment (UE) with priority information for a measurement by:
sending, by the RAN node, a configuration message to the UE, the configuration message comprising the priority information, so that the UE performs a measurement task and reports at least one measurement result according to the priority information; and
receiving, by the RAN node, the at least one measurement result from the UE,
wherein:
the priority information comprises at least one of a priority parameter or a mapping rule, and
the priority information comprises a delay parameter for indicating a reporting timing of the at least one measurement result, wherein the delay parameter indicates differentiated reporting timing for the at least one measurement result based on a priority level.

2. The method according to claim 1, wherein:
the measurement comprises a minimization of drive test (MDT); and
the measurement task comprises an MDT task.

3. The method according to claim 1, wherein:
the configuration message comprises non-access stratum (NAS) information.

4. The method according to claim 1, wherein:
the RAN node compiles and sends a radio resource control (RRC) message to the UE, the RRC message comprising the configuration message for the UE.

5. The method according to claim 1, wherein:
the priority information is used for UE to determine a radio bearer to transmit the at least one measurement result.

6. The method according to claim 1, wherein:
the delay parameter indicates at least one of the following:
reporting the at least one measurement result without delay,
reporting the at least one measurement result within a time duration, or
reporting the at least one measurement result at a specific time.

7. The method according to claim 1, wherein:
the priority information comprises the mapping rule; and
the mapping rule indicates at least one of the following:
a lowest-priority radio bearer to be used for transmitting the at least one measurement result,
a highest-priority radio bearer to be used for transmitting the at least one measurement result,
a specific radio bearer to be used for transmitting the at least one measurement result, or
a range of a plurality of radio bearers to be used for transmitting the at least one measurement result.

8. A method for wireless communication, comprising:
configuring a user equipment (UE) with priority information for a measurement by:
receiving, by the UE, a configuration message from a radio access network (RAN) node, the configuration message comprising the priority information; and
performing, by the UE, a measurement task and reporting at least one measurement result according to the priority information,
wherein:
the priority information comprises at least one of a priority parameter or a mapping rule, and
the priority information comprises a delay parameter for indicating a reporting timing of the at least one measurement result, wherein the delay parameter indicates differentiated reporting timing for the at least one measurement result based on a priority level.

9. The method according to claim 8, wherein:
the measurement comprises a minimization of drive test (MDT); and
the measurement task comprises an MDT task.

10. The method according to claim 8, wherein:
the configuration message comprises non-access stratum (NAS) information.

11. The method according to claim 8, wherein:
the RAN node compiles and sends a radio resource control (RRC) message to the UE, the RRC message comprising the configuration message for the UE.

12. The method according to claim 8, wherein:
the priority information is used for UE to determine a radio bearer to transmit the at least one measurement result.

13. The method according to claim 8, wherein:
the delay parameter indicates at least one of the following:
reporting the at least one measurement result without delay,
reporting the at least one measurement result within a time duration, or
reporting the at least one measurement result at a specific time.

14. The method according to claim 8, wherein:
the priority information comprises the mapping rule; and
the mapping rule indicates at least one of the following:
a lowest-priority radio bearer to be used for transmitting the at least one measurement result,
a highest-priority radio bearer to be used for transmitting the at least one measurement result,
a specific radio bearer to be used for transmitting the at least one measurement result, or
a range of a plurality of radio bearers to be used for transmitting the at least one measurement result.

15. An apparatus comprising:
a memory storing instructions; and
a processor in communication with the memory, wherein, when the processor executes the instructions, the processor is configured to cause the apparatus to perform:
configuring a user equipment (UE) with priority information for a measurement by:
sending a configuration message to the UE, the configuration message comprising the priority information, so that the UE performs a measurement task and reports at least one measurement result according to the priority information; and receiving the at least one measurement result from the UE, wherein:

the priority information comprises at least one of a priority parameter or a mapping rule, and the priority information comprises a delay parameter for indicating a reporting timing of the at least one measurement result, wherein the delay parameter indicates differentiated reporting timing for the at least one measurement result based on a priority level.

16. The apparatus according to claim 15, wherein:

the measurement comprises a minimization of drive test (MDT); and the measurement task comprises an MDT task.

17. An apparatus comprising:

a memory storing instructions; and a processor in communication with the memory, wherein, when the processor executes the instructions, the processor is configured to cause the apparatus to perform:

configuring the apparatus with priority information for a measurement by:

receiving a configuration message from a radio access network (RAN) node, the configuration message comprising the priority information; and performing a measurement task and reporting at least one measurement result according to the priority information, wherein:

the priority information comprises at least one of a priority parameter or a mapping rule, and the priority information comprises a delay parameter for indicating a reporting timing of the at least one measurement result, wherein the delay parameter indicates differentiated reporting timing for the at least one measurement result based on a priority level.

18. The apparatus according to claim 17, wherein:

the measurement comprises a minimization of drive test (MDT); and the measurement task comprises an MDT task.

* * * * *